(12) United States Patent
d'Alayer de Costemore d'Arc

(10) Patent No.: US 6,377,538 B1
(45) Date of Patent: Apr. 23, 2002

(54) CARTRIDGE HOUSING FOR RECORDING DISCS

(75) Inventor: Stephane Marie Andre d'Alayer de Costemore d'Arc, Genappe (BE)

(73) Assignee: Staar S.A. (BE)

( * ) Notice: Subject to any disclaimer, the term of this patent is extended or adjusted under 35 U.S.C. 154(b) by 0 days.

(21) Appl. No.: 09/433,865

(22) Filed: Nov. 4, 1999

(30) Foreign Application Priority Data

Nov. 18, 1998 (BE) .............................................. 9800833

(51) Int. Cl.$^7$ .............................................. G11B 23/03
(52) U.S. Cl. ....................................................... 369/291
(58) Field of Search ......................... 369/291; 360/133; 206/308.1, 308.3, 309

(56) References Cited

U.S. PATENT DOCUMENTS

| | | | | |
|---|---|---|---|---|
| 3,062,552 A | | 11/1962 | Schwarz ......................... | 274/1 |
| 3,554,462 A | | 1/1971 | Bundschuh .................. | 242/197 |
| 4,471,397 A | | 9/1984 | Cloutier ....................... | 360/133 |
| 4,652,961 A | | 3/1987 | Dieffenbach ................ | 360/133 |
| 5,260,931 A | * | 11/1993 | Sasaki et al. ............... | 369/291 |
| 5,787,069 A | | 7/1998 | Lowe et al. .................. | 369/291 |
| 5,969,916 A | * | 10/1999 | Schick et al. ............... | 360/133 |

FOREIGN PATENT DOCUMENTS

| | | |
|---|---|---|
| DE | 9404004 | 3/1993 |
| DE | 29711505 | 7/1997 |
| EP | 0260876 | 3/1988 |
| EP | 0768662 | 4/1997 |
| EP | 0794532 | 9/1997 |
| GB | 2228818 | 9/1990 |
| GB | 2326515 | 12/1998 |
| JP | 76493 | 1/1995 |
| JP | 10-320952 | * 12/1998 |
| JP | 10-334630 | * 12/1998 |
| JP | 11-110945 | * 4/1999 |
| JP | 11-339424 | * 12/1999 |
| JP | 11-345475 | * 12/1999 |
| JP | 2000-132938 | * 5/2000 |

* cited by examiner

*Primary Examiner*—William Klimowicz
(74) *Attorney, Agent, or Firm*—Leydig, Voit & Mayer, Ltd.

(57) ABSTRACT

A cartridge housing for a recording disc has a thin, flat, substantially circular shape and includes a cover and a bottom at least one of which has an aperture allowing access by a reading or recording head of a reading/recording unit to a recording surface of a contained disc. A flat shutter is pivotally mounted around a shaft inside the cartridge housing for movement between aperture-closed and aperture-open positions responsive to limited relative rotational movement of the cover and bottom. An actuating leg extending from the shutter adjacent an edge diametrically opposite the shaft location cooperates with a arcuate chamber in the adjacent peripheral edge of the cover to move the shutter between the aperture-closed and aperture-open positions. The cover has a diameter slightly larger than the diameter of the bottom to show a user how to properly orient the cartridge housing when loading it into a reading/recording unit, and conceals and protects the actuating leg for the shutter by making it inaccessible from outside the housing. One of the cover and bottom parts has a discontinuity which is engagable when a cartridge housing is placed within a drawer or guide member of a reading/recording unit to hold the one of the parts against movement and enable relative rotation of the parts to operate the shutter. A retainer on the shutter engages the disc to restrain it against movement when the shutter is in an aperture-closed position.

25 Claims, 3 Drawing Sheets

US 6,377,538 B1

CARTRIDGE HOUSING FOR RECORDING DISCS

FIELD OF THE INVENTION

The present invention relates to cartridges providing protective housings for recording discs and, more particularly, to housings serving as protective devices for discs, such as optical discs, having recordings on one or both surfaces of the discs. These cartridges are used to protect the recorded surfaces of the discs and include a mobile shutter or door covering an access aperture and operable to uncover the aperture to allow optical reading and/or recording devices to access the disc surface for purposes of reading or making recordings on the surface.

BACKGROUND OF THE INVENTION

The cartridges available on the market have a parallelepipedic shape, such as disclosed in the European applications EP-A-0260876, EP-A-0768662 and EP-A-0794532 and generally comprise ribs, which increase their thickness, to improve their stiffness because presently the discs are thin (±1.3 mm.) but of a rather large size (8 to 12 cm. in diameter). Further, their shutters are mounted for translation on the outside of said cartridges with the main drawback that the user can easily manipulate them, thus gain access to the disc and damage its surfaces. These cartridges also comprise a discontinuity to induce the user to load them with the correct orientation in reading/recording units, but those discontinuities are not always effective and quite often the reading/recording units must incorporate specific means to check the proper orientation of a cartridge presented by a user before allowing any further insertion movement.

Furthermore, the almost universal use of a parallelepipedic cartridge to protect discs is the source of a large waste of space, almost 25% of the volume, which is in contrast with the present trend of the industry to manufacture very compact units.

In another field, the motion picture field, a cartridge has been proposed having a partially circular shape, as described in U.S. Pat. No. 3,554,462, but since it was designed for the storage of a reel of film, it is mainly the reel which protects the film and the opening allowing access to the film is set laterally in a parallelepipedic boss.

SUMMARY OF THE INVENTION

One object of the present invention is to overcome those various drawbacks by providing a cartridge for a recording disc which is simple, compact and stiff and provides a high level of protection.

Another object of the invention is to provide a cartridge having a shape which induces the user to insert it with the correct orientation in the appropriate reading and/or recording unit.

Additional characteristics and unique features will be evident from the following description of preferred embodiments of the invention to which improvements and modifications can be brought without departing from the scope of the invention as defined in the appended claims:

DETAILED DESCRIPTION OF THE INVENTION

Figure 1:
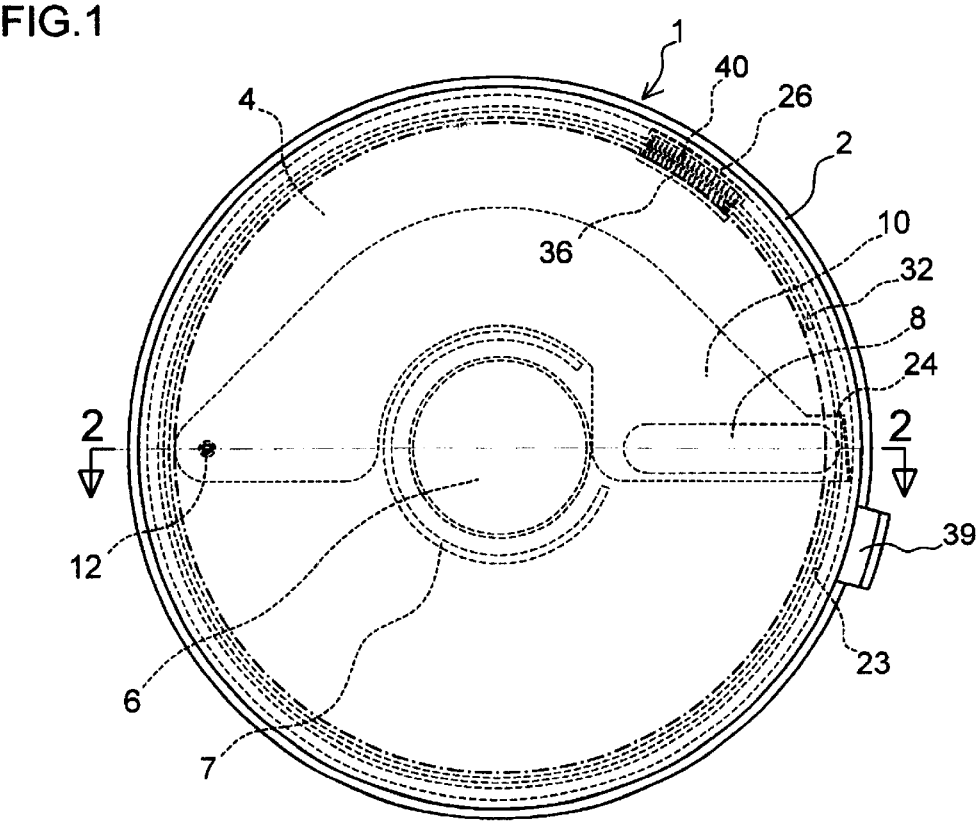
FIG. 1 is a top view of a cartridge housing for a recording disc according to a preferred embodiment of the invention.

To facilitate the understanding of the invention, each figure shows only the elements necessary for the description of the invention.

Referring to FIGS. 1–6, a cartridge housing 1 is shown for recording discs such as optical or video discs and having, according to the invention, a thin circular shape which provides an appreciable saving of space (almost 20%) compared to any parallelepipedic cartridge housing. This cartridge housing, in keeping with the invention, is made of two main parts: a cover 2 and a bottom 3 each of which have a substantially flat, circular shape and parallel major outside surfaces, and can either fit, snap into or engage each other or be glued, welded together to provide a protective enclosure slightly larger than the disc 4 contained in the housing. In the most preferred embodiment, those two parts fit together and are fastened with a sliding connection so that they are mounted for limited relative rotational movement, as shown a rotational movement of about 15°.

The bottom 3 bears (FIG. 3) a central opening 6 to allow driving means to cooperate with the disc 4 to cause its rotation inside the cartridge housing 1 when within a reading/recording unit, and an oblong aperture 8 is provided in the bottom 3 to allow access to the bottom surface of the disc 4 by a read/record head.

A generally circular shoulder 7 provided on the inside surface of each of the bottom 3 and the cover 2, more particularly in an area where the disc bears no data, engage the disc and locate it so as to prevent the surfaces of the disc from entering into contact with internal surfaces of the bottom 3 and the cover 2 or other components, and also serves to stiffen those two parts.

If the disc 4 must be clamped on its driving means, then a central opening 6 is also provided in the cover 2 of the cartridge housing 1 to allow clamping means (not shown) to act on the disc 4. For some types of discs which include in their central part a magnetically permeable ring, their clamping is ensured by magnetic flux, and the cover 2 does not need any central opening.

According to the invention, a shutter 10 which is pivotally movable between aperture-open and aperture-closed positions is mounted inside the cartridge housing 1. When the shutter 10 is in the aperture-open position a read/record head of a unit is allowed to access the bottom surface of the disc 4 which bears data. Should both surfaces bear data, then an opening 6 and an aperture 8 are also provided in the cover 2.

In carrying out the invention, the shutter 10 is a flat, thin member located to perform a pivotal movement, preferably around or beyond the central axis of the cartridge housing 1 and, in the most preferred embodiment, pivots about a shaft 12, such as a socket riveted to the bottom 3 of the cartridge housing 1 near its external periphery. When in the aperture-closed position, the shutter 10 covers the access aperture 8 when the disc 4 and the cartridge housing 1 are in a stable inoperative position. The shutter 10 bears at its extremity, diametrically opposed to the socket 12, an actuating member 14 such as an actuating leg (FIGS. 4, 5) cooperating on the one hand with a gap or aperture 30 extending for about 15° in the annular up-standing vertical wall 32 of the bottom 3 of the cartridge housing 1 and on the other hand with an arcuate chamber 20 (FIG. 6) extending along an arc of about 15° in the lower part of the downwardly extending internal wall 22 of the cover 2. These two walls 22 and 32 are concentric, the outer periphery of the wall 32 being located adjacent the inner periphery of the wall 22; this configuration with clearance between the wall 32 and the wall 22 allows these walls to slide relative to each other thereby ensuring and guiding the relative rotation between the cover 2 and the bottom 3 of the cartridge housing 1 while stiffening them and allowing their assembly by a conventional snap fit entailing legs and grooves which are not shown.

Figure 5:
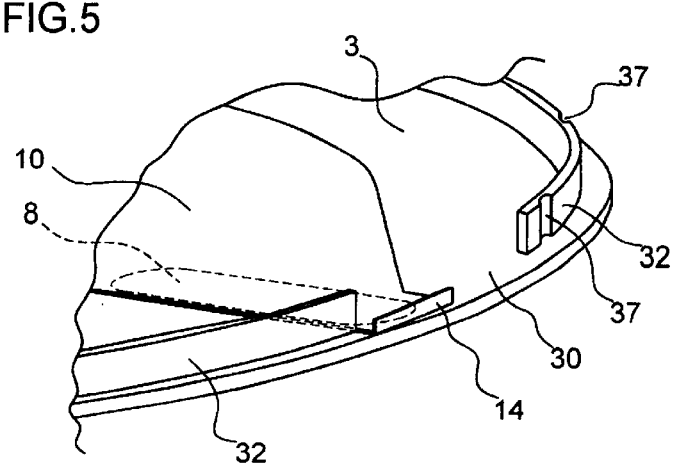
FIG. 5 is a perspective view of a portion of the bottom part of the device shown in FIG. 3, without a disc and in inoperative or stable position.
Figure 4:
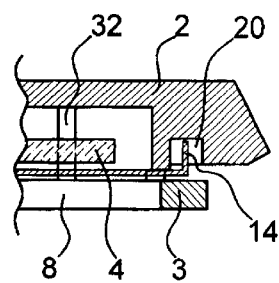
FIG. 4 is an enlarged fragmentary sectional view of a portion of the device shown in FIG. 2.
Figure 6:
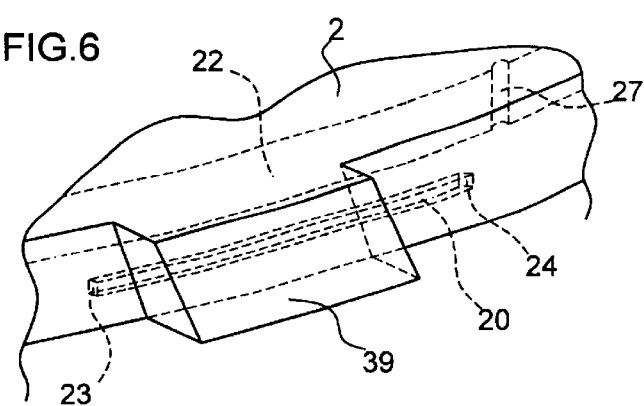
FIG. 6 is a perspective view of a portion of the cover part of the device shown in FIGS. 1, 2, 4.

The shutter 10 is operated by relative rotational movement of the bottom 3 and the cover 2. Referring to FIGS. 1, 5 and 6, in the stable position of the components (FIG. 1) the shutter 10 is locked in the aperture-closed position by the engagement of the actuating leg 14 with the right-hand flank 24 of the chamber 20 and the wall 32 at the left-hand side of the aperture 30. When the bottom 3 and cover 2 rotate relatively from this stable position, the shutter 10 is caused to pivot to uncover the aperture 8 and be locked in the aperture-open position.

Figure 3:
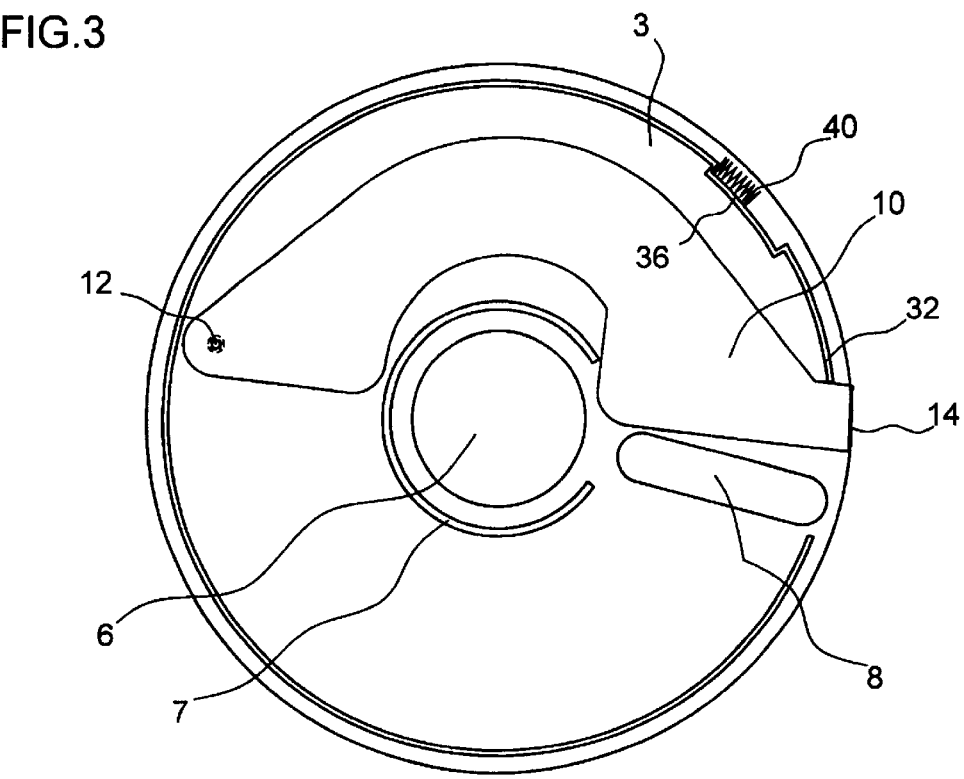
FIG. 3 is a top view of the bottom part of the device shown in FIG. 1, without a disc but in operative position in which data reading and/or recording is possible.
Figure 2:
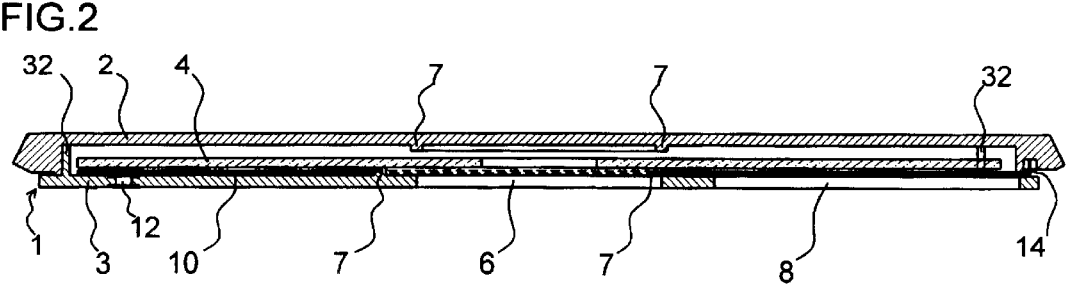
FIG. 2 is a sectional view of the device of FIG. 1 along the vertical plane of line 2—2.
Figure 7:
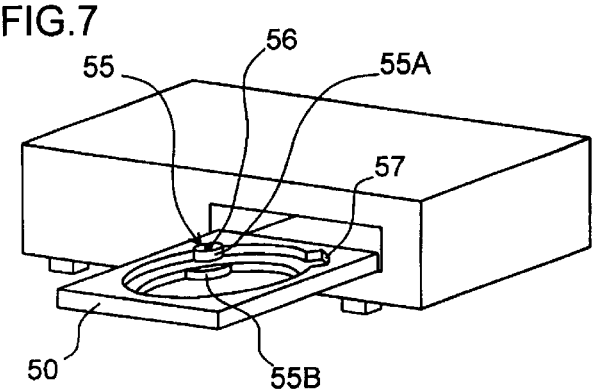
FIG. 7 shows in perspective a reading and/or recording unit for devices as shown in FIGS. 1 to 6.

In the embodiment of FIGS. 1–6, when the cartridge housing 1 with a disc 4 contained therein is used in a reading/recording unit such as shown in FIG. 7, the bottom 3 undergoes a clockwise rotation (viewed from above) while the cover 2 stays immobile, to shift the bottom 3 clockwise to the position illustrated in FIG. 3. In the course of this movement of the bottom 3, the actuating leg 14 is carried with the bottom 3 until it is stopped by the flank 23 located at the left hand-side of the chamber 20 provided in the cover 2 (FIG. 6). Then the bottom 3, upon further rotation, simultaneously moves the aperture 8 from beneath the shutter 10 and the socket 12 further clockwise. As a result, the shutter 10, moved by the socket 12, pivots around the actuating leg 14 in the opposite direction thus uncovering the aperture 8 to allow access to the disc 4; this pivotal movement of the shutter 10 is stopped when the wall 32 of the bottom 3 located at the right hand-side of the aperture 30 (FIG. 3) abuts against the actuating leg 14 already resting against the flank 23; accordingly, the shutter 10 is locked in its aperture-open position uncovering the aperture 8.

The reading/recording unit then may be operated to rotate the disc 4 and to read and/or record data. After operation of the unit, to return the components to stable position, the bottom 3 of the cartridge housing 1 is rotated counter-clockwise. First, the shutter 10 and the actuating leg 14 follow the movement of the bottom 3 until the flank 24 located on the right hand-side of the chamber 20 provided in the cover 2 prohibits any further movement of the actuating leg 14. Upon further rotation, the bottom 3 rotates the aperture 8 underneath the shutter 10 which simultaneously pivots in the opposite direction to close it (FIG. 5) until the wall 32 of the bottom 3 located on the left hand-side of the aperture 30 abuts the actuating leg 14 already resting against the flank 24. Accordingly, the shutter 10 is locked in its aperture-closed position between the flank 24 of the chamber 20 and the edge of the wall 32.

For powering the relative movement between the cover 2 and the bottom 3 and keeping the device in the stable position of FIG. 1 in which the shutter 10 covers the aperture 8, notches 26, 36 (FIGS. 1, 3) are desirably provided in the cover 2 and the bottom 3, respectively, to house resilient means, herein shown as a compression spring 40 mounted to urge the cover 2 and the bottom 3 relatively. Instead of notches and resilient means to lock the device in position, a detent arrangement may be used, such as a boss 27 (FIG. 6) in a flexible part of the wall 22 of the cover 2 or the cover 2 itself, engagable in locking elements shown as grooves 37 (FIG. 5) provided in the wall 32 of the bottom 3 or the bottom 3 itself. The boss 27 and grooves 37 maintain the cover 2 and the bottom 3 selectively in the aperture-closed and aperture-open positions in which the aperture 8 is covered (FIGS. 1, 5), and uncovered (FIG. 3).

The shutter 10, constructed according to the invention, is reliable in operation because the shutter 10 in its stable position always ensures the covering of the aperture 8 in the cartridge housing 1. The shutter 10 construction and mounting is simple to manufacture because it is made from a flat sheet pivotally mounted on a shaft and with the actuating leg 14 formed from the sheet. It is selectively locked in position by either the spring 40 in cooperation with the actuating leg 14 and the chamber 20 in the cover 2, or the detent arrangement provided by the boss 27 and the locking grooves 37. By having the socket 12 set in a position diametrically opposed to the actuating leg 14, the shutter 10 requires only a low control amplitude for its operation (about 10°).

Referring to FIGS. 8–11, an alternative embodiment is shown of a cartridge housing 1 and shutter 10 associated with a disc 4. In this embodiment, the actuating leg 14 of the shutter 10 is always locked or confined in-between the two flanks 23 and 24 of the chamber 20 (FIG. 9) which is almost of the same width as the actuating leg 14. Further, in this embodiment it is the cover 2 which is rotated with respect to the bottom 3 to operate the shutter 10. By confining the actuating leg 14 within the chamber 20, when the cover 2 is rotated counter-clockwise (viewed from above) between 10–15 degrees, the shutter 10 will be pivoted from the stable aperture-closed position of FIG. 8 covering the aperture 8 to the aperture-open position of FIG. 10 uncovering the aperture 8.

Figure 8:
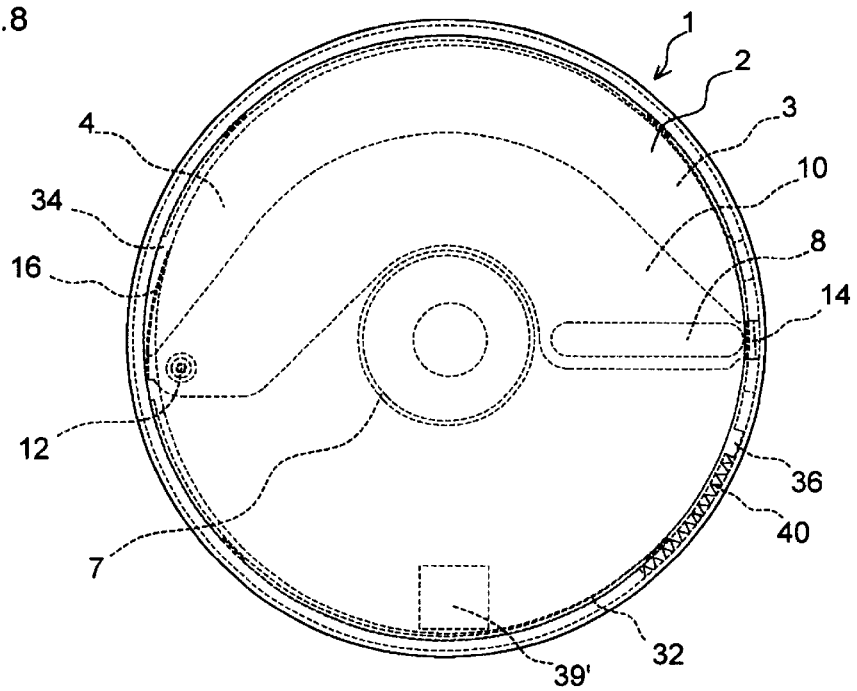
FIG. 8 is similar to FIG. 1 but discloses another embodiment.
Figure 9:
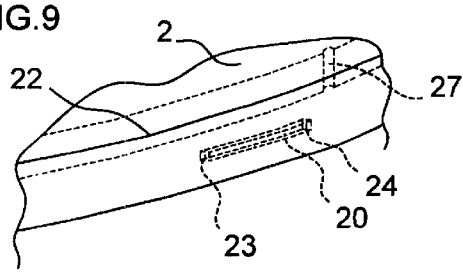
FIG. 9 is similar to FIG. 6 for the embodiment of FIG. 8.
Figure 11:
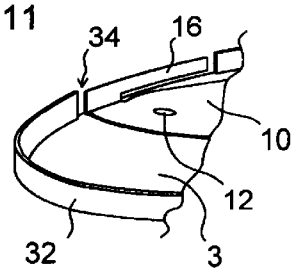
FIG. 11 shows in perspective a detail of an element appearing on FIGS. 8 and 10.
Figure 10:
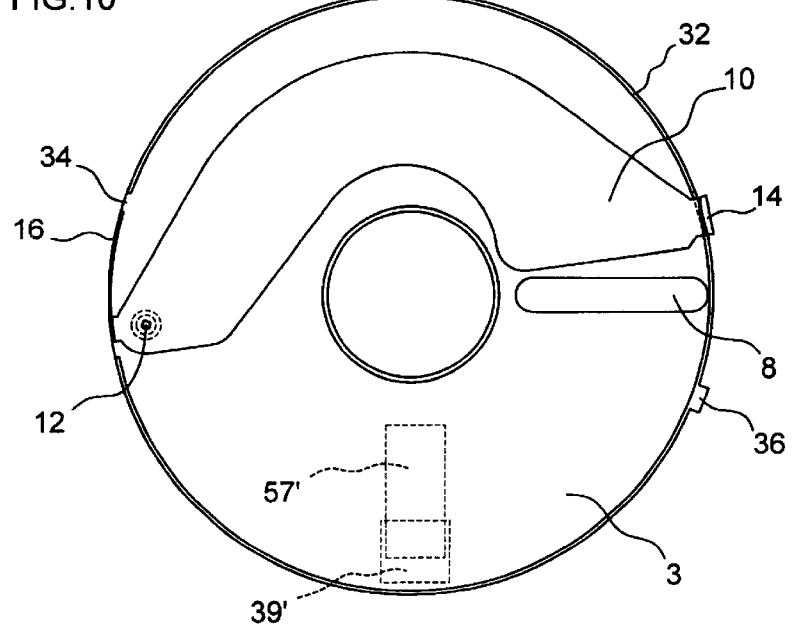
FIG. 10 is similar to FIG. 3 for the embodiment of FIG. 8.

Further in keeping with the invention, in this embodiment (see FIG. 11) there is provided a retainer cooperating with the periphery of a disc 4 to restrain it against erratic movements or vibrations when the cartridge housing 1 is in stable or inoperative position. For this purpose, the shutter 10 includes a retainer finger 16 bent at a right angle from the edge of the flat shutter 10 in the vicinity of the socket or pivot 12. The shutter 10 is formed of appropriate material so that the retainer finger 16 is provided as a thin, flexible member which is slightly pre-stressed inwardly so that its internal face engages the periphery of the disc 4, and pushes the opposite edge of the disc 4 against an almost diametrically opposed location along the inner periphery of the vertical wall 32 provided on the bottom 3, when the cartridge housing 1 and shutter 10 are in a stable, inoperative aperture-closed position (FIG. 8). Upon pivotal movement of the shutter 10 around the socket or pivot 12, when the cartridge housing 1 is being set in operative position, and the shutter is pivoted to the aperture-open position, the retainer finger 16 is pivoted away from the periphery of the disc 4 and parked in a recess 34 provided in the internal face of the wall 32 (FIG. 11) to clear it entirely. The disc 4 is then free for unrestrained movement in the cartridge housing 1 and it can be centered and clamped on its driving means. As a result, the retainer finger 16 restrains the disc 4 against movement as long as it is not in use, and thus protects its surfaces when the cartridge housing 1 is being handled and stored, or transported, a further aspect of the invention.

As a further aspect of the invention, the external profiles of the bottom 3 and the cover 2 provide a clear discontinuity; for example, in the described embodiments (FIGS. 2, 4, 8) the profile of the cover 2 is of a diameter larger than that of the bottom 3. This allows the user to easily distinguish the correct orientation of the cartridge 1, and protects the leg 14 which is inaccessible (FIG. 4) and thus prevents any actuation of the shutter 10 from the outside, a substantial advantage over cartridges available on the market. Alternatively, for the cartridge housing 1, the bottom 3 may have a slightly larger diameter than that of its cover 2.

Preferably, reading/recording units for cartridge housings 1 and recording discs have an insertion slot for such a cartridge housing 1 or for a drawer or tray 50 (FIG. 7) for receiving such a cartridge housing 1, which drawer or tray 50 has a recess matching the profile of the cartridge housing 1 to induce the user to load the cartridge housing 1 with the correct orientation. Such a discontinuity may be fixed by being molded unitarily with the cover 2 and/or the bottom 3, is reliable because it does not require any movement of any specific part contrary to all existing devices and is dimensioned to forestall the user from attempting to force a mis-oriented cartridge 1 either through a slot or into a drawer or tray.

In the described embodiments, the external profiles (FIG. 2) of the bottom 3 and the cover 2 may be shaped to cooperate with mechanisms of the reading/recording units provided to power the relative rotational movement of the bottom and cover parts of the housing cartridge 1.

As shown in FIG. 7, a drawer, tray or guide member 50 of a reading/recording unit is provided with a substantially circular cavity with a profile for receiving a cartridge housing 1 constructed according to one of the embodiments of the invention. Adjacent the edge of the cavity in the drawer a powered roller 55 (FIG. 7) is mounted having, for the first embodiment (FIGS. 1–6), two concentric surfaces 55A, 55B. The cartridge housing 1 of this first embodiment is provided with a discontinuity shown as a boss 39 at the periphery of the cover 2. By powering the roller 55 around its shaft 56 using a micro-motor (not shown), the cartridge housing 1 will be rotated within the cavity of the drawer 50 until its discontinuity 39 is stopped by a stopping element herein shown as a recess 57 in the inner peripheral edge of the cavity in the drawer 50. The drawer 50 may then be operated to load the cartridge housing 1 within the unit and the lower roller 55 B then is powered to rotate the bottom 3 relative to the cover 2, which relative rotation operates the shutter 10 by causing it to pivot from its stable aperture-closed position to its operative aperture-open position uncovering the aperture 8, as previously described.

For the second embodiment (FIGS. 8–10), the discontinuity in one of the cover 2 and the bottom 3 is a cavity 39' in the underside of the bottom 3 of the cartridge housing 1 (FIG. 10) which is engaged by a flexible arm 57' mounted on the bottom of the drawer 50. After the cartridge housing 1 is loaded within the unit, the movement of the bottom 3 by the lower roller 55 B being then restricted, the surface 55A of the roller may be used to power the rotation of the cover 2 only and thus its relative movement, as described hereabove, uncovers the aperture 8.

The micro-motor or other source powering the roller 55 is then switched off, for instance after a predetermined time delay, and the cartridge housing 1 is kept in the operative position within the drawer 50 by the surfaces 55A or 55B of the roller 55 during operation of the reading/recording unit.

Further features and advantages of the invention will be apparent from the foregoing taken together with the following claims.

I claim:

1. A cartridge housing for a recording disc comprising:

a housing consisting of a first housing half including a bottom and a second housing half including a cover, the bottom and cover each having a flat, substantially circular shape, the first and second halves of the housing being fastened together at peripheral edges by a sliding connection which allows limited rotational movement of the first and second halves of the housing;

one of the halves of the housing having an access aperture allowing access to a surface of a disc when rotationally mounted inside the housing between the halves of the housing; and a shutter pivotally mounted within the housing and movable between aperture-open and aperture-closed positions responsive to relative rotational movement of the first and second halves of the housing.

2. The cartridge housing according to claim 1 wherein the halves of the housing each have a substantially flat major surface and together form a thin circular housing slightly larger than the recording disc contained in the housing.

3. The cartridge housing according to claim 1 wherein the shutter includes an actuating member for the shutter engageable by one of the cover and the bottom to move the shutter between the aperture-open and aperture-closed positions responsive to relative rotation between the housing parts.

4. The cartridge housing according to claim 3 wherein the actuating member for the shutter and the aperture are located adjacent a peripheral edge and the shutter is mounted for pivotal movement around a shaft located diametrically opposite the access aperture and the actuating member.

5. The cartridge housing according to claim 3 wherein one of the bottom and the cover includes a peripheral arcuate chamber having flanks which cooperate with the actuating member for the shutter and cause movement of the shutter responsive to relative rotation of the first and second halves of the housing.

6. The cartridge housing according to claim 5 wherein the actuating member is confined between the flanks of the arcuate chamber, whereby the shutter is operated upon relative rotational movement of the first and second halves of the housing in either direction between aperture-closed and aperture-open positions, and wherein a detent and cooperating elements are provided to maintain the first and second halves of the housing selectively in said positions.

7. The cartridge housing according to claim 5 wherein the actuating member is located with substantial clearance between the flanks of the arcuate chamber which is wider than the actuating member, and is movable between engagement with one of the flanks thereby defining the aperture-closed position of the shutter and a second of the flanks thereby defining the aperture-open position of the shutter, and wherein a resilient member is mounted to urge the first and second halves of the housing relatively and the actuating member toward the aperture-closed position engaged with said one of the chamber flanks.

8. The cartridge housing according to claim 3 wherein a peripheral edge of one of the halves of the housing covers the actuating member of the shutter to make it inaccessible from outside the cartridge housing.

9. The cartridge housing according to claim 5 wherein the flanks of the arcuate chamber cooperate with the actuating member to lock the shutter selectively in one of the aperture-open and aperture-closed positions.

10. The cartridge housing according to claim 3 including a resilient member mounted between the cover and the bottom to urge the cover and bottom to rotate relatively in one direction and to move the shutter.

11. The cartridge housing according to claim 3 including a resilient compression member mounted between the cover and the bottom to urge the cover and bottom to rotate relatively and to move the shutter toward the aperture-closed position.

12. The cartridge housing according to claim 3 including a detent member on one of the halves of the housing cooperating with elements on the other of the parts to maintain the cover and the bottom selectively in one of the aperture-open and aperture-closed positions.

13. The cartridge housing according to claim 1 wherein the cover and bottom have different profiles to show to the user a correct orientation for loading in a reading/recording unit.

14. The cartridge housing according to claim 12, wherein the cover has a diameter larger than the bottom.

15. The cartridge housing according to claim 1, wherein one of the cover and the bottom includes a discontinuity engageable to hold the one of the cover and the bottom against movement and enable relative rotation thereof to operate the shutter.

16. A cartridge housing for a recording disc comprising:
   housing parts including a bottom and a cover each having a flat, substantially circular shape, the housing parts being fastened together at peripheral edges by a sliding connection which allows limited rotational movement of the housing parts;
   one of the housing parts having an access aperture allowing access to a surface of a disc when rotationally mounted inside the housing between the housing parts;
   a shutter pivotally mounted within the housing and movable between aperture-open and aperture-closed positions;
   an actuating member for the shutter cooperating with one of the cover and the bottom to move the shutter between the aperture-open and aperture-closed positions responsive to relative rotation between the housing parts; and
   a resilient member mounted between the cover and the bottom to urge the cover and bottom to rotate relatively in one direction and to move the shutter between said positions.

17. A cartridge housing for a recording disc comprising:
   housing parts including a bottom and a cover each having a flat, substantially circular shape, the housing parts being fastened together at peripheral edges by a sliding connection which allows limited rotational movement of the housing parts;
   one of the housing parts having an access aperture allowing access to a surface of a disc when rotationally mounted inside the housing between the housing parts;
   a shutter pivotally mounted within the housing for movement about a pivot diametrically opposite the access aperture between aperture-open and aperture-closed positions;
   an actuating member for the shutter cooperating with one of the cover and the bottom to move the shutter between the aperture-open and aperture-closed positions responsive to relative rotation between the housing parts; and
   a retainer finger extending from the shutter in the vicinity of the pivot which engages the disc inside the housing at a peripheral edge of the disc when the shutter is in the aperture-closed position to restrain the disc against movement.

18. The cartridge housing according to claim 17 wherein the retainer finger comprises a thin, flexible member which is slightly pre-stressed inwardly so that an internal face thereof engages the disc inside the housing at a peripheral edge of the disc and pushes an opposite edge of the disc against a vertical wall provided on the bottom, when the shutter is in the aperture-closed position, to restrain the disc against movement, the retainer finger being pivoted away from the peripheral edge of the disc, upon pivotal movement of the shutter to the aperture-open position, and parked to clear the disc entirely and allow unrestrained movement thereof.

19. In combination, a disc reading/recording unit and a cartridge housing having a thin, flat, substantially circular profile, the cartridge housing containing a recording disc;
   the cartridge housing having:
      housing parts including a bottom and a cover each having a flat, substantially circular shape, the housing parts being fastened together at peripheral edges by a sliding connection which allows limited rotational movement of the housing parts, one of the cover and the bottom having a discontinuity;
      the bottom having an access aperture allowing access to a recording surface of a disc when rotationally mounted inside the housing;
      a shutter pivotally mounted within the housing and movable between aperture-open and aperture-closed positions responsive to relative rotational movement of the cover and bottom;
   the reading/recording unit having:
      a loading member for receiving and loading the cartridge housing in the unit;
      an element engaging the discontinuity in the one of the cover and bottom to hold the one against rotation when the cartridge housing is loaded in the unit; and
      a powered device engaging the cartridge housing to move the cover and bottom relatively and operate the shutter.

20. The combination according to claim 19 wherein the cover includes the discontinuity and the loading member has an element engaging the discontinuity to hold the cover of the cartridge housing against rotation.

21. The combination according to claim 19 wherein the bottom includes the discontinuity and the recording unit has an element engaging the discontinuity to hold the bottom of the cartridge housing against rotation.

22. The combination according to claim 19 wherein the discontinuity comprises a projection from one of the housing parts the and the recording unit has an element engaging the discontinuity to hold one of the housing parts against rotation.

23. The combination according to claim 19 wherein the discontinuity comprises a recess in one of the housing parts and the recording unit has an element engaging the discontinuity to hold the one of the housing parts against rotation.

24. A cartridge housing for a recording disc comprising:

housing parts including a bottom and a cover each having a flat, substantially circular shape, the housing parts being fastened together at peripheral edges by a sliding connection which allows limited rotational movement of the housing parts;

one of the housing parts having an access aperture allowing access to a surface of a disc when rotationally mounted inside the housing between the halves of the housing parts;

a shutter pivotally mounted within the housing and movable between aperture-open and aperture-closed positions; and an actuating member for the shutter, the actuating member being inaccessible from outside of the cartridge housing and cooperating with one of the cover and bottom to move the shutter between the aperture-open and aperture-closed positions responsive to relative rotation between the housing parts.

25. A cartridge housing for a recording disc comprising:

a housing consisting of a first housing half including a bottom and a second housing half including a cover, the bottom and cover each having a flat, substantially circular shape, the first and second halves of the housing being fastened together at peripheral edges by a sliding connection which allows limited rotational movement of the first and second halves of the housing;

one of the halves of the housing having an access aperture allowing access to a surface of a disc when rotationally mounted inside the housing between the halves of the housing; and a shutter mounted within the housing and movable between aperture-open and aperture-closed positions responsive to relative rotational movement of the first and second halves of the housing.

* * * * *